No. 804,339. PATENTED NOV. 14, 1905.
J. S. PLOOF & C. J. MONGEON.
DETACHABLE BRACKET FOR SHADE ROLLERS.
APPLICATION FILED JUNE 27, 1905.

Witness
Wm. B. Poor.
F. H. Houston.

Joseph Sylvester Ploof.
Charles Joseph Mongeon.
Inventors
by Ellis Spear Jr.
Attorney

UNITED STATES PATENT OFFICE.

JOSEPH SYLVESTER PLOOF AND CHARLES JOSEPH MONGEON, OF BURLINGTON, VERMONT.

DETACHABLE BRACKET FOR SHADE-ROLLERS.

No. 804,339. Specification of Letters Patent. Patented Nov. 14, 1905.

Application filed June 27, 1905. Serial No. 267,210.

*To all whom it may concern:*

Be it known that we, JOSEPH SYLVESTER PLOOF and CHARLES JOSEPH MONGEON, citizens of the United States, residing at Burlington, in the county of Chittenden and State of Vermont, have invented certain new and useful Improvements in Detachable Brackets for Shade-Rollers, of which the following is a specification.

This invention relates to adjustable brackets for shade-rollers, and has for its object the production of a bracket which shall be capable of easy adjustment and at the same time not liable to spread and release the shade-roller which it is intended to support.

It is a further object of this invention to produce an auxiliary device in connection with the above for supporting a rod for the window-draperies.

To these ends we have therefore devised a certain form of sliding bracket and a certain arrangement of spring which combine in a structure that accomplishes the desired results and is at the same time simple and cheap.

Figure 1:
Figure 2:
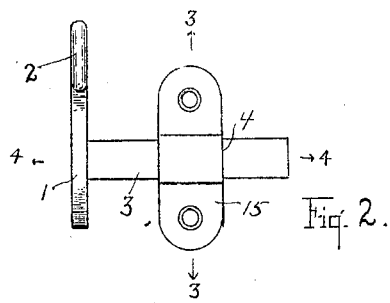
Figure 3:
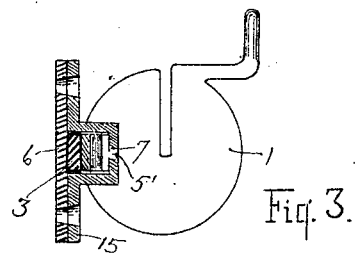
Figure 4:
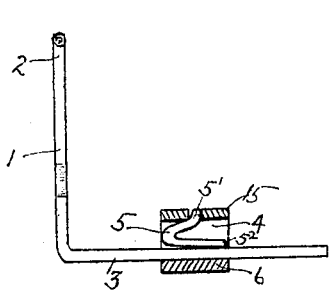
Figure 5:
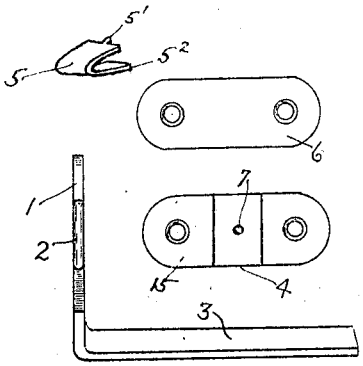

Referring to the drawings which form a part of the specification in this case, in which like figures of reference indicate corresponding parts throughout, Figure 1 is a view of a bracket in place. Fig. 2 is a view of the same with roller and rod removed. Fig. 3 is a section on the line 3 3, Fig. 2. Fig. 4 is a section on the line 4 4, Fig. 2; and Fig. 5 is a view of the parts of the bracket removed.

1 is a bracket having an extension-hook 2 for the support of a drapery-rod and a shank 3, which passes within the recess 4 of the plate 15.

6 is an auxiliary plate which coöperates with the plate 15 to produce the recess 4, through which the shank 3 passes. Within this recess 4 is located a spring 5, bent in the form of a $U$ and having one end slightly upturned, as at $5'$, to engage in the opening 7 in the plate 15 and with the other end $5^2$ left free.

In assembling the parts the plates 15 and 6 are united by the fastening-screws which pass through the holes 8, or they may be riveted or soldered together before they are put in place. The spring is then inserted with its two ends facing inward toward the window. The shank 3 of the bracket is now inserted so that the bracket 1 will be on the outside and away from the free end $5^2$ of the spring, which presses on the shank and holds the same in place with a yielding pressure. After the bracket is fastened in place the roller is inserted in the usual manner.

The brackets may be pierced with the usual hole and slot, or the pair of brackets may have a round hole and a squared hole for the reception of the respective ends of the roller, which will be engaged by a slight lateral adjustment. As the spring faces inward with its ends and the free end $5^2$ bears upon the shank 3 of the bracket, this end, in addition to its general spring-pressure, also resists any outward strain upon the bracket by a binding effect which its end $5^2$ has on the surface of shank 3.

The spring is easily inserted or removed by pushing from its open ends with any convenient instrument, as a knife, screw-driver, or even a nail, and in case the spring is broken a new spring can be inserted without trouble and without tools.

The hook 2 supports the drapery-rod by being inserted in the usual hole therein. This hook may be bent laterally and extended to the side or disposed in any other suitable manner.

The bracket can be adjusted by pulling or pushing it into the desired position, where it will be firmly held by the spring.

Various modifications in the form and arrangement of parts of our invention may be made and the parts may be cast integral or made in separate pieces without departing from the spirit of our invention.

What we therefore claim, and desire to secure by Letters Patent, is—

1. The combination in a shade-roller bracket, of a support for the roller having a shank, a plate having a recess through which said shank passes and a $U$-shaped spring in said recess, having one end engaged by said plate and the other end in contact with said shank.

2. In a bracket for shade-rollers, the combination of a bracket having a shank, a plate having a recess through which said shank passes, a $U$-shaped spring in said recess and disposed with its free ends away from the shade, an opening in said plate adapted to receive one end of said spring, the other end of said spring bearing upon said shank.

3. In a bracket for shade-rollers, the combination of a bracket having a shank, a plate having a recess through which said shank passes, a U-shaped spring in said recess, and an opening in said plate to receive the end of said spring.

4. The combination in a shade-roller bracket, of a support for the roller having a shank, a pair of plates having a recess between them through which said shank passes, a U-shaped spring in said recess, one end of said spring being engaged by said plate and the other end bearing upon said shank.

5. In a bracket for shade-rollers, the combination of a combined rod-support and roller-bracket having a shank, a plate having a recess through which said shank passes, a U-shaped spring in said recess and disposed with its free ends away from the shade and an opening in said plate adapted to receive one end of said spring, the other end of said spring bearing upon said shank.

In testimony whereof we affix our signatures in presence of two witnesses.

JOSEPH SYLVESTER PLOOF.
CHARLES JOSEPH MONGEON.

Witnesses:
   LILLIAN ELIZA PECK,
   THEODORE ELI HOPKINS.